(12) United States Patent
Amend

(10) Patent No.: US 8,840,943 B2
(45) Date of Patent: Sep. 23, 2014

(54) MULTI-COLORED CAKE CONES

(75) Inventor: Thomas Amend, Shanghai (CN)

(73) Assignee: Nestec S.A., Vevey (CH)

( * ) Notice: Subject to any disclaimer, the term of this patent is extended or adjusted under 35 U.S.C. 154(b) by 1217 days.

(21) Appl. No.: 11/697,381

(22) Filed: Apr. 6, 2007

(65) Prior Publication Data

US 2008/0248169 A1    Oct. 9, 2008

(51) Int. Cl.
*A23L 1/27* (2006.01)
*A21D 13/00* (2006.01)
*A21C 15/02* (2006.01)

(52) U.S. Cl.
CPC .......... *A21D 13/0029* (2013.01); *A21D 13/008* (2013.01); *A21C 15/025* (2013.01); *A21D 13/0087* (2013.01)
USPC ........... 426/249; 426/138; 426/139; 426/104; 426/383; 426/391; 426/497

(58) Field of Classification Search
CPC ..... A23G 9/506; A23G 9/288; A21C 15/025; A21C 15/02; A21D 13/0029; A21D 13/0087
USPC ......... 426/138, 139, 249, 389, 497, 391, 250, 426/100–101, 94–95, 104, 383, 514
See application file for complete search history.

(56) References Cited

U.S. PATENT DOCUMENTS

| | | | | |
|---|---|---|---|---|
| 4,283,430 | A | | 8/1981 | Doster et al. ................. 426/284 |
| 5,079,015 | A | * | 1/1992 | Herting ........................ 426/249 |
| 5,089,278 | A | | 2/1992 | Haynes et al. ................. 426/98 |
| 5,223,286 | A | | 6/1993 | Selbak ............................ 426/94 |
| 6,177,112 | B1 | * | 1/2001 | Dufort et al. ..................... 426/95 |
| 2002/0150663 | A1 | * | 10/2002 | Haas et al. .................... 426/548 |
| 2004/0180120 | A1 | * | 9/2004 | Leas et al. ..................... 426/139 |

FOREIGN PATENT DOCUMENTS

| | | | |
|---|---|---|---|
| BE | 1014605 | 1/2001 | |
| CA | 2016961 | * 11/1990 | ............... A21B 5/02 |
| DE | 3817919 | 12/1988 | |
| DE | 4036560 | 5/1991 | |
| EP | 0679341 | 11/1995 | |
| GB | 2 291 578 A | 7/1995 | |
| HU | 214 189 B | 1/1998 | |
| JP | 58071869 | 4/1993 | |

* cited by examiner

*Primary Examiner* — Drew Becker
*Assistant Examiner* — Luana Z Long
(74) *Attorney, Agent, or Firm* — Dunlap Codding, P.C.

(57) ABSTRACT

The present invention relates to a multi-colored baked cake cone typically for holding ice cream or other confection novelties. This cone is made of a dough bi-layer that includes at least a first layer of a conventional cake dough that contains sugar and a second layer of a modified cake dough that imparts at least one color other than brown to the cone after baking. The cone is typically associated with a sleeve that is at least partially transparent to display the multicolor cone.

19 Claims, 6 Drawing Sheets

Dosing of decorating lines

Dosing of regular batter

Baking

Removing

A

B

MULTI-COLORED CAKE CONES

FIELD OF THE INVENTION

The present invention relates generally to the field of rolled cones. In particular, the present invention relates to rolled cones with multiple colors for holding frozen or other confection novelties.

BACKGROUND OF THE INVENTION

Two principal types of conventional cones are known: molded cones and rolled or sugar cones. Molded cones are produced by baking the batter in a mold that determines the final shape of the cone. The finished cone is removed as a largely dry and form stable product having brittle characteristics.

Rolled cones are produced by baking the batter between flat baking molds and immediately afterwards shaping the still hot wafer sheet into its final cone shape. The batter is first dosed onto the baking base plate, then the cover baking plate is closed. During closing, the batter gets spread out between the plates into the final form of the wafer sheet. After the baking process, the plates are opened again to remove the baked wafer sheet. Right after opening the baking plates, the wafer sheet is still hot but also flexible and can be shaped without breaking into a cone shape. Shaping is done by rolling the sheets around a conical tool where the cone cools down quickly and solidifies, resulting in a largely dry and form stable product also having brittle characteristics.

To the skilled artisan it is known that sugar plays an important role in manufacturing rolled cones. While molded cones come out of the baking process in their final shape as a brittle product, the rolled cones are flexible and can be shaped during a short period of time until they cool down and solidify.

The flexibility of the rolled cones are due to their high sugar content. In the still hot wafer sheet, the sugar is liquid or plastic thus giving the wafer sheet its plasticity. Upon cooling, the plasticity is lost and the wafer sheet solidifies into the shape given.

If the sugar content in the rolled cones is too low, the wafer sheet has not enough flexibility to be shaped. Such a wafer sheet is very brittle and will break apart when it is rolled into the cone shape.

This is the fundamental difference between molded cones and rolled cones: molded cones need a low sugar content and come out of the mold in the final shape as a brittle product, whereas rolled cones need a high sugar content to have flexibility to be shaped by rolling as long as the sugar is in a liquid or plastic state.

Another consequence of the sugar content concerns the color. It is well known that the sugar in the wafer turns brown during baking. Whereas molded cones develop only a light brown or almost white color during baking, due to their low sugar content, rolled cones develop a darker brown color during baking due to their high sugar content.

The experts in the field are well aware that an almost white colored rolled cone cannot be produced from the ingredients normally used in cone baking, since the low sugar content required for the light color would not provide sufficient flexibility for rolling. If a wafer sheet is underbaked, i.e., baked at a too low temperature, the browning reaction of the sugar is less pronounced but the baking result is not sufficient. Such wafer sheets are still wet and do not solidify after rolling due to their high residual water content.

U.S. patent application No. 2002/0150663 describes a formulation, in which the sugar has been replaced by a polyol (erythritol or xylitol), in order to reduce the caloric value of the cone. The patent application describes that these sugar replacers act as a plasticizer in a way similar to sugar. However, it is mentioned that these cones show no browning reaction, i.e. the wafer sheet has a mostly white appearance. Such cones, as mentioned in the patent application, can be colored, as a whole, to achieve a natural looking color or any other color desired.

The application of color in the manufacturing of cones is quite common. A widespread practice is the addition of color such as caramel color to enhance the natural color of the cone or improve the color homogeneity. Also other colors are used sometimes to create cones with, e.g. a reddish or blue tone. However, for rolled cones, these added color tones always mix with the brown color resulting from the browning of the sugar. A mostly white color cannot be created using a standard recipe, since the browning of the sugar already establishes a dark base tone.

It is known to experts in the field that a two color cone can be produced by dosing simultaneously onto the baking plate both a regular batter and a batter that contains added color, e.g. caramel color. The result is a cone that contains patches of the regular batter and other patches containing the colored batter. The distribution of the different colors is determined by the spreading pattern that is created when the baking plates are closed and the batter becomes spread between them. Using this technique, the color distribution and pattern created is poorly controlled and the designs that can be achieved are limited.

Therefore, there is no known way to make colored rolled cones without sugar or sugar replacers. A sugarless dough would not be considered for making rolled cones since a sugarless dough would create brittle areas in the wafer sheet that would obstruct proper rolling into a cone shape. Accordingly, the resulting baked rolled cone products made from a regular sugar wafer batter recipe, are not fully satisfactory when different colors in the cones are desired. Thus, the present invention is designed to provide a process and product which achieves these features and remedies the deficiencies of the prior art.

SUMMARY OF THE INVENTION

The present invention relates to a multi-colored baked cake cone typically for holding frozen novelties. This cone comprises a dough bi-layer comprising at least a first layer of a conventional cake dough that contains sugar and a second layer of a modified cake dough that imparts at least one color other than brown to the cone after baking. The conventional cake dough is typically present as a support for the modified dough and contains sugar in an amount sufficient to impart flexibility to the conventional dough. Thus, the conventional dough can be shaped to conform to the desired shape or configuration of the cone, and the modified dough layer provides a different color to the cone to change its color appearance compared to conventional cone products.

The invention also relates to the frozen novelties comprising these multi-colored cones and a filling of an ice confection therein (e.g., ice cream cones). In a preferred embodiment, the cone is placed in a packing, which is at least partly composed of a transparent thermoplastic polymer sleeve so that the different colors are observable through the sleeve.

The invention also relates to a method of preparing a multi-colored baked cake cone for holding such ice confection or other novelties. This method comprises forming a dough bi-layer by associating at least a first layer of a conventional cake dough that contains sugar with a second layer of a modified cake dough that imparts at least one color other than brown or black to the cone after baking, shaping the dough bi-layer into a cone, and baking the shaped dough to provide a multicolor cake cone, with the conventional cake dough present at a thickness sufficient to support the modified dough during the shaping and containing an amount of sugar sufficient to impart flexibility to the conventional dough, such that the conventional dough provides support necessary to maintain the cone in the desired shape or configuration of the cone, and the modified dough layer provides a different color to the cone to change its color appearance compared to conventional baked cake cones.

DETAILED DESCRIPTION OF THE PREFERRED EMBODIMENTS

It has now been found that a sugarless batter or substantially sugar free can be used in the manufacturing of rolled cones to create attractive decorative patterns. This batter will remain white during baking, resulting in attractive white features (lines, waves, dots), or the color can be modified by added colors. In the latter case, the color will be more pronounced since there is no browning reaction that would otherwise interfere with the effect of the added color. And while sugar does not have to be present, the batter can tolerate some sugar provided that it does not cause browning to the degree that the desired color is lost. Thus, in order to achieve a lighter color for a line on a rolled sugar cone, the level of sugar has to be lower than the sugar content of the regular batter, with a sugarless dough giving the preferred most white color.

The technique developed comprises the use of a sugarless dough that is applied in the form of lines, circles, waves or dots to create decorative patterns on the rolled cone. The sugarless dough is applied onto the hot baking plate prior to dosing the regular (sugar containing) batter.

In a second step, the regular batter is dosed and may cover or not the previously dosed decorative patterns. When the cover baking plate gets closed, the secondly dosed dough is spread into the final shape of the wafer sheet and fully covers the firstly applied decorative patterns.

Looking at this process in more detail, the firstly applied decorative pattern forms a surface layer only that is backed-up by a conventional sugar cone batter. Typically, about half of the thickness of the wafer sheet consists of the layer applied firstly, whereas the other half is made up from the conventional batter. In line with the knowledge of the experts in the field, the sugarless batter would be expected to be hard and brittle after baking and obstruct the rolling process. In contrast, it was found that when attached to a back-up layer of regular batter, the brittle layer of sugarless batter follows the bending of the back-up layer and does not break off or obstruct the rolling process.

By applying a thin layer of sugarless batter onto a back-up layer of regular batter, it is possible to provide the desired visual features of a white color to an industrially manufactured cone. Suitable relative thicknesses of the layers would include from 33 to 75 to as high as 95% for the sugar containing (or structural) layer and less than 67 to as little as desired of the decorative or modified dough. As noted herein, the decorative dough does not have to form a uniform layer and can be provided in the form of stripes, dots, or other shapes or patterns since the sugar containing dough provides essentially all of the necessary structural support for the confection that is placed in the cone.

Figure 1:
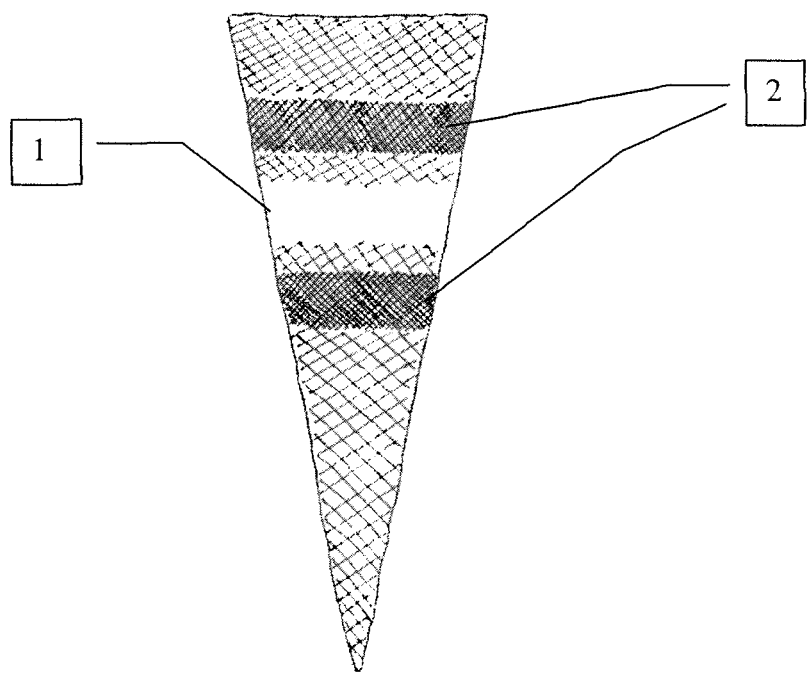
FIG. 1 is a schematic representation of three decorative lines, two dark or black lines around one white line, on a cone surface.

As illustrated in FIG. 1 which shows a rolled cone with one white line 1 and two dark lines 2, the present invention enables rolled cones to be made in industrial production wherein the cones feature distinct decoration patterns such as lines (straight or bended) or dots or combinations, in a manner that cannot be achieved by the prior art such as by attempting to dose batters of different colors onto a baking plate simultaneously.

As noted, the invention concerns the area of rolled cones, but is not limited to the cone shape but includes also other shapes that can be produced from the hot wafer sheet by pressing, stamping, folding or bending.

It has been found that it is preferable to apply a thin layer of decorating batter independent of whether this batter is sugarless or not. If the decorating batter is applied in a thick layer onto the baking plate prior to dosing the regular batter, part of the decorative batter will become displaced during dosing of the regular batter or during the spreading of the batter when the baking plates are closed. This will first result in a widening of the decorative line or dot beyond the pattern originally dosed onto the baking plate. Another deleterious effect will be an entrapment of decorative batter in the middle between layers of regular batter. The latter effect will cause the decorative batter to shine through the layer of regular batter and cause an unwanted color effect.

The underlying mechanism of action of the present invention is linked to the instantaneous viscosity increase of the batter that is in direct contact with the hot baking plate. A layer of decorative batter that is deposited onto the hot baking plate will become highly viscous or thicken due to the gelatinization of the starch granules in the batter. The gelatinization will start first with those starch granules that directly touch the baking plate (i.e., the plate side). The starch granules that are more distant to the surface of the baking plate, i.e. those granules facing towards the upper surface of the layer of decorative batter (i.e., the air side) will take longer to gelatinize. Since gelatinization means viscosity increase, a thick layer of decorative batter will be highly viscous and immobile at the plate side but fluid and easy to be displaced at the air side.

Although even a thick layer of decorative batter will completely and homogeneously gelatinize within a few seconds, it is essential to keep the layer thin in the case of using a sugarless batter. A thick layer of sugarless batter, fully gelatinized throughout, will not give room for the formation of a thick-enough back-up layer from regular batter, thus increasing the risk of breakage and obstruction of the rolling process. A not fully gelatinized layer of sugarless batter will be partly displaced during dosing of the regular batter and the closing of the baking plates, thus blurring the design. Further, it is advantageous to keep the opening time of the baking plates as short as possible to have a maximum of time available for the actual baking process. Thus, the time available for gelatinization of a decorative line of batter is to be kept short and only a thin layer will gelatinize within a short period of time available at a fast running production line.

A thin layer of decorative batter applied onto the hot baking plate will thicken even in a very short time and will hence not be displaced during the application and spreading of the regular batter.

Also, a relatively thick layer of decorative batter will thicken only on the plate side, whereas the air side will still be liquid when the regular batter is applied and spread. Therefore, this liquid batter will become displaced and the originally applied shape will be blurred.

It is understood that a thin layer means a layer of batter that does not protrude high over the surface of the baking plate—the width of the layer can be freely chosen by skilled artisans to be very narrow or very wide, as desired.

Figure 2:
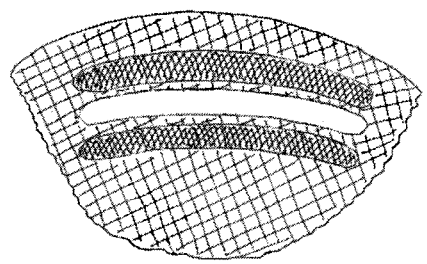
FIG. 2 is a schematic representation of three decorative lines applied on a wafer sheet of a "flat-top" sugar cone, prior to the rolling of the wafer sheet.
Figure 3:
FIG. 3 is a schematic representation of a slit-nozzle for dosing the decorative batter in a thin layer onto a baking plate.
Figure 4:
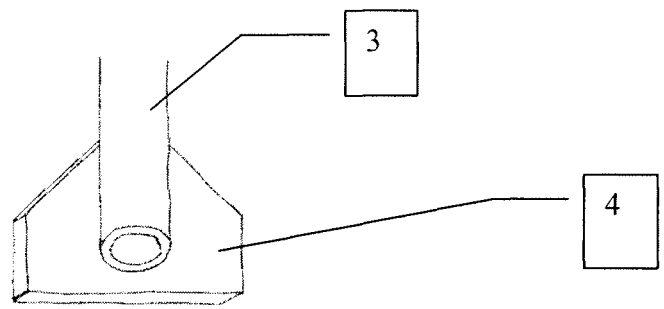
FIGS. 4A and 4B are schematic representations of a nozzle (dosing tube) for dosing decorative batter onto a baking plate that is equipped with a spreading device, with FIG. 4A being a front view of a nozzle equipped with a spreading plate and FIG. 4B a side view of a spreading device during dosing decorative batter onto a baking plate in a thin layer.
Figure 4:
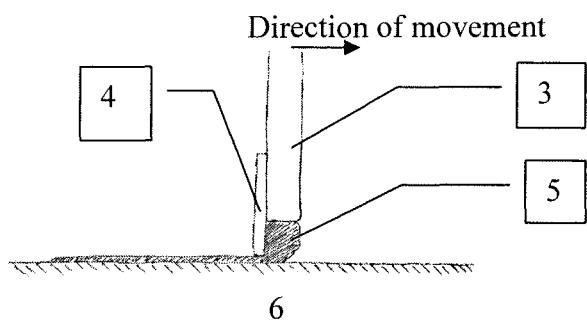

From the understanding of the underlying mechanisms, a number of different ways exist for applying decorative lines of batter in a way to achieve a thin layer that maintains its sharp contours throughout the baking process, such as the one shown in FIG. 2. One technique consists in applying the decorative batter onto the baking plate through a slit shaped dosing nozzle (FIG. 3). The shape of the slit defines the width and thickness of the batter layer. As shown in FIGS. 4A and B, another technique to create lines of thin layers of decorative batter consists in a spreading device comprising a dosing tube 3 and a spreading plate 4 installed in a way that the decorative batter 5 is spread or smeared over the baking plate 6 in a thin layer. Yet another technique consists in spraying the decorative batter onto the plate in a thin layer.

Industrial wafer cone producers use continuous processes. For in-line machines, baking plates are either linked together to form an endless chain that moves through an oven for baking and out of the oven for removal of the baked wafer sheets and application of the new batter portions. In rotary baking machines, the baking plates are arranged on a circular manner on a disk that turns and thereby moves through a baking zone. In either case, the movement of the baking plates is continuous and uninterrupted.

To apply the decorative batter, special equipment is needed that includes pumps, dosing pipes and nozzles and a device to trace lines or waves. Such equipment needs to draw the desired lines or waves during the uninterrupted movement of the baking plates. In the case of a rotary baking machine, which is characterized by having a continuous band of wafer material that is later cut apart into individual wafer sheets, a continuous flow of decoration pattern can be applied onto the zone that will be covered by the batter. A one directional movement of the dosing nozzle is required for a wave shape and no movement at all for a straight line.

Such a one-directional movement can be created using air piston cylinders that are synchronized with the movement of the baking plates. The constant stream of batter can be produced by a mono-pump which feeds the batter to the dosing nozzle.

Figure 5:
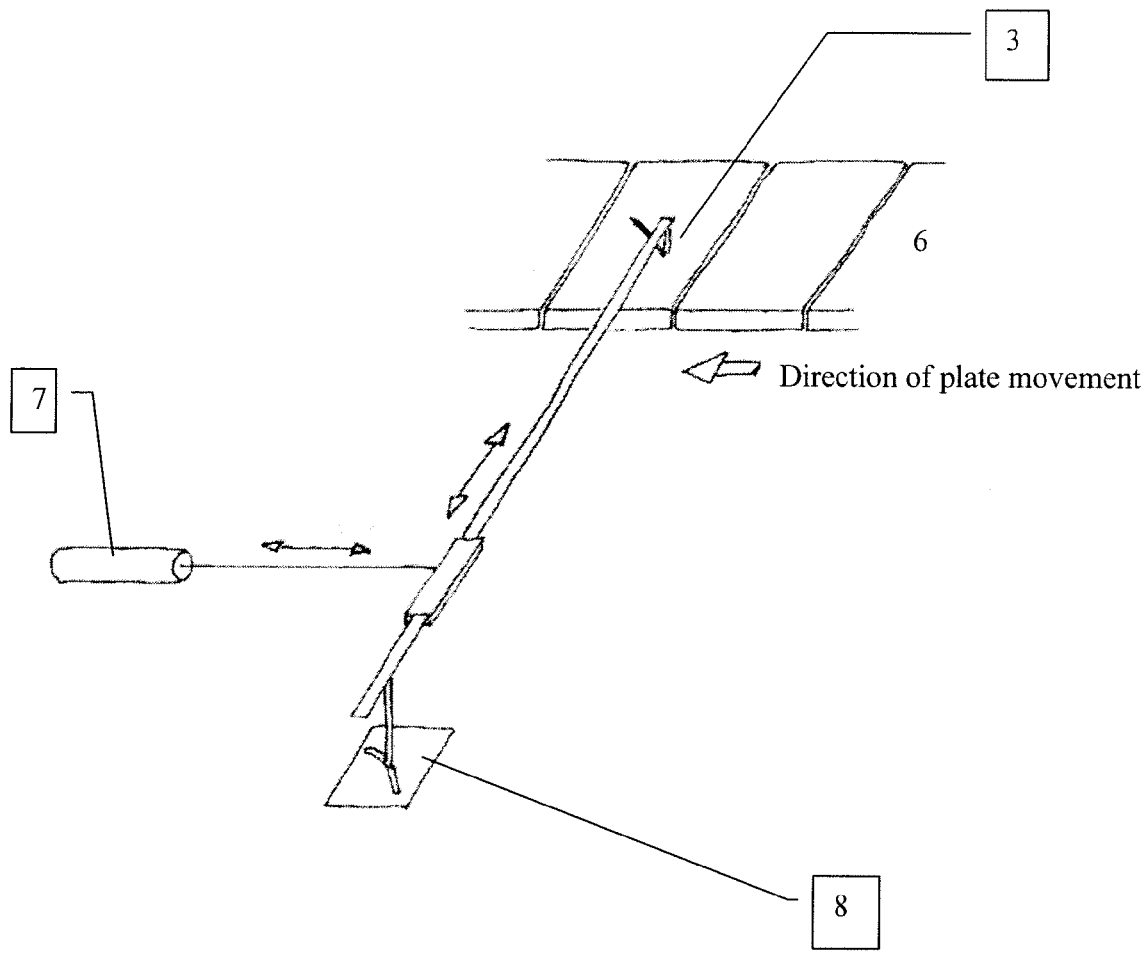
FIG. 5 is a schematic representation of an overall system for applying a line of a defined shape onto the baking plates according to the invention.

For in-line machines, the wafer sheets are not linked together and need to be picked-up individually from the baking plates. Dosing of decorative wave patterns need to be performed with nozzles that move preferably in two directions. Further, the stream of decorative batter needs to get interrupted to keep the baking plate clean between the areas covered by the wafer sheets. As shown in FIG. 5, the movement of the nozzle of the dosing tube 3 in two directions can be created by using an air piston 7 to control the first movement, which is synchronized with the movement of the baking plates 6, and a cam plate 8 to move the nozzle in the Z-direction, which is perpendicular to the first movement.

The dosing pump for the decorative batter needs to stop the flow between the baking plates or be equipped with a shut-off valve to interrupt the flow.

Cones are usually sold in a wrapper that either made from paper or a paper/aluminum composite material. To best display the decoration effects on a sugar cone to the consumer, a transparent sleeve is best suited for this purpose. The transparent area should be fully transparent or sufficiently transparent to display the decorative pattern and should cover at least 10% of the visible surface of the sleeve. Typically, a fully transparent sleeve made of a transparent thermoplastic plastic film is preferred for simplicity although a combination of an aluminum coated sleeve, covering the upper part of the cone, and a transparent plastic part, covering the lower part is also suitable. Again a skilled artisan can best design the sleeve and packaging to display the coloration of the cone.

Regarding novelty products that are made with such cones, these would include both frozen and non-frozen confections. Typical frozen confections include ice cream, water ice, yogurt, frozen yogurt, sherbert, fruit ice, low fat ice cream, ice milk, etc. Typical non-frozen confections include various types of candies and fondants, most of which are based on chocolate. In this application, the term "chocolate" is used to refer to all chocolate or chocolate-like compositions with a temperable fat phase including all those that contain at least one cocoa or cocoa-like component in the temperable fat or temperable fat-like phase. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, non-standardized chocolates and chocolate-like compositions.

Composite confections can also be included in this invention. For example, the multi-colored cone of the invention can be provided with an inner chocolate coating, with or without inclusions such as nuts, fruit or hard candy pieces, cookie pieces or the like. Then, a filling of an ice confection can be provided therein. Of course, a skilled artisan can envision many other types and combinations of components which can be housed by the present multi-color cones, and these are all deemed to be part of the invention.

EXAMPLES

Example 1

Rolled Wafer Cones Decorated with a White Line

A regular sugar containing batter for rolled sugar wafer was prepared from the following ingredients:

| Ingredient | Percent by wt. |
|---|---|
| Flour | 38 |
| Sugar | 14 |
| Lecithin | 0.5 |

| Ingredient | Percent by wt. |
|---|---|
| Oil | 2 |
| Water | 45.5 |

And a sugarless dough was prepared following the recipe below:

| Ingredient | Percent by wt. |
|---|---|
| Flour | 32 |
| Lecithin | 0.5 |
| Oil | 2 |
| Water | 65.5 |

Figure 6:
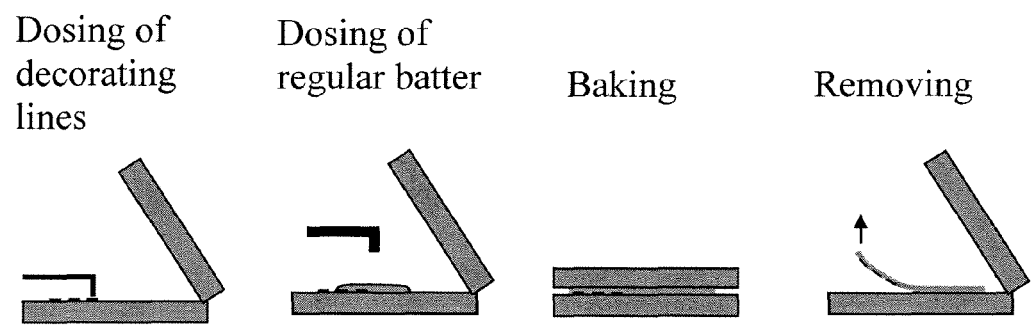
FIG. 6 is a schematic representation of a four-step process according to the invention to manufacture decorated cones.

The general scheme for manufacturing decorated cones is shown in FIG. 6. First, using a dosing nozzle equipped with a spreading plate (FIG. 4), a dosage of 0.6 g sugarless dough was dispensed onto the hot baking plate to form a line (1 cm wide and 0.5 mm thick).

Subsequently, a dosage of 25 g regular sugar containing batter was poured over the sugarless layer. Following the closing of the baking plate, the regular dough was spread into the final shape of a wafer sheet of 1.5 mm thick, which fully covered the sugarless layer. After baking, the wafer sheet was picked-up and rolled around a conical tool where the cone cools down quickly and solidifies, without breaking, resulting in a largely dry and form stable cone with a height of 120 mm.

Example 2

Rolled Wafer Cones Decorated with a Dark Line

The recipes and the process were the same as those of Example 1 except that the sugarless layer was replaced by a sugar containing layer with a dark color, e.g. caramel color.

What is claimed is:

1. A method of preparing a multi-colored baked cake cone, which comprises:
    dosing a thin layer of controlled width of a modified cake dough to a first baking plate to provide a decorative pattern of lines, circles, waves or dots of a color other than brown or black;
    completely and homogeneously gelatinizing the dough to ensure that the decorative pattern maintains its contours during subsequent operations;
    applying a conventional cake dough that contains sugar and that will become brown or black after baking onto the completely and homogeneously gelatinized modified cake dough in the pattern;
    thereafter applying a second baking plate upon the first so that the conventional cake dough spreads into the final shape of a wafer sheet and fully covers the decorative pattern and baking the conventional dough to form a baked wafer, wherein the modified cake dough is formulated to impart at least one color other than brown or black to the cone after baking and rolling, and wherein the modified cake dough is one that after baking is (a) either white in color or includes added colors other than brown or black, (b) does not contain a sugar substitute and (c) is sugarless or substantially sugar free with any sugar present in the modified cake dough being in an amount that is less than that which provides browning to the degree that the imparted color is lost during baking; rolling the wafer sheet after baking to provide a multicolor cake cone, with the conventional cake dough present at a thickness sufficient to support the modified cake dough during the rolling, and containing an amount of sugar sufficient to impart flexibility to the conventional dough after baking, such that the conventional dough provides support necessary to maintain the cone in the desired shape or configuration after baking, and wherein the modified cake dough layer, after baking, provides a different color other than brown or black to the cone to change its color appearance compared to baked cake cones of conventional sugar containing dough.

2. The method of claim 1, wherein the modified cake dough is applied using a dosing nozzle having an opening that defines the width and thickness of the layer.

3. The method of claim 2, wherein the modified cake dough is applied through one or more movable dosing nozzles that trace the desired shapes as the baking plates move below the nozzles.

4. The method of claim 2, wherein the modified cake dough is from a dosing nozzle that is operatively associated with a pump and a device that traces the desired movements during the dosing operation.

5. The method of claim 2, wherein the modified cake dough is applied-from a dosing nozzle that includes a spreading tool that flattens the lines, circles, waves or dots of the modified cake dough to facilitate gelatinization.

6. The method of claim 1, wherein the modified cake dough is applied using a tubular dosing nozzle, and wherein the method further comprises flattening the modified cake dough after forming the lines, circles, waves or dots on the baking plates from the dosing nozzle to facilitate gelatinization.

7. The method of claim 1, further comprising applying simultaneously a second modified cake dough of a different color prior to the application of the conventional cake dough and baking to form the final cone.

8. The method of claim 1, which further comprises filling the cone with an ice confection to form a frozen novelty.

9. The method of claim 8, which further comprises housing the cone in a sleeve that is transparent over at least 10% of its surface.

10. The method of claim 9, wherein the sleeve is made of a thermoplastic polymer and the colors are observable through the transparent portion of the sleeve.

11. The method of claim 8, wherein the conventional cake dough has a thickness of 33% to 95% of the total thickness of the wafer sheet to provide essentially all of the necessary structural support for the ice confection that is placed in the cone.

12. A multi-colored baked cake cone having a decorative pattern of lines, circles, waves or dots of a color other than brown or black upon a support of a conventional sugar containing cake cone, wherein the multi-colored baked cake cone is provided by the method of claim 1.

13. The cone of claim 12, wherein the modified cake dough provides at least two different colors to the cone after baking.

14. The cone of claim 13, wherein at least one of the colors is provided as one or more straight lines or as a plurality of shapes.

15. The cone of claim 13, wherein at least one of the colors is provided as a plurality of lines having a width of 1 mm to 2 cm.

16. The cone of claim 13, wherein the different colors are provided as dots having a diameter of 1 mm to 2 cm.

17. The cone of claim 12, which is housed in a sleeve that is transparent over at least 10% of its surface, wherein the sleeve is made of a thermoplastic polymer.

18. A frozen novelty comprising the multi-colored cone of claim 17 and a filling of an ice confection therein, wherein the colors are observable through the transparent portion of the sleeve.

19. A frozen novelty comprising the multi-colored cone of claim 12 and a filling of an ice confection therein.

\* \* \* \* \*